US010680822B2

(12) United States Patent
Panshin et al.

(10) Patent No.: US 10,680,822 B2
(45) **Date of Patent: *Jun. 9, 2020**

(54) REPLACEABLE ITEM AUTHENTICATION

(71) Applicant: Hewlett-Packard Development Company, L.P., Spring, TX (US)

(72) Inventors: Stephen D. Panshin, Corvallis, OR (US); Jefferson P. Ward, Brush Prairie, WA (US); Erik D. Ness, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,912

(22) Filed: Jul. 15, 2019

(65) Prior Publication Data

US 2019/0342098 A1 Nov. 7, 2019

Related U.S. Application Data

(63) Continuation of application No. 16/295,445, filed on Mar. 7, 2019, which is a continuation of application (Continued)

(51) Int. Cl.
*G06F 21/44* (2013.01)
*H04L 9/32* (2006.01)
(Continued)

(52) U.S. Cl.
CPC ........ *H04L 9/3226* (2013.01); *B41J 2/17543* (2013.01); *B41J 2/17546* (2013.01);
(Continued)

(58) Field of Classification Search
CPC ... H04L 9/3226; H04L 9/3273; H04L 9/3236; B41J 2/17543; B41J 2/17546; G06F 12/1408; G06F 12/1458; G06F 2212/402
See application file for complete search history.

(56) References Cited

U.S. PATENT DOCUMENTS 7,084,951 B2 8/2006 Silverbrook
7,788,490 B2 8/2010 Adkins et al.
(Continued)

FOREIGN PATENT DOCUMENTS

CN 101971134 2/2011
CN 105431837 3/2016
(Continued)

OTHER PUBLICATIONS

Ink and Toner Supplies, accessed online 912/2016, < http://www8.hp.com/in/en/ads/toner-acf/overview.html >.
(Continued)

*Primary Examiner* — Brian F Shaw
(74) *Attorney, Agent, or Firm* — Michael A. Dryja

(57) ABSTRACT

A print substance cartridge for a printing device includes a supply of print substance for the printing device, a non-volatile memory, and logic. The memory stores authentication values by which the print substance cartridge is authenticated by the printing device, and/or a cryptographic key from which a plurality of authentication values are able to be generated within the print substance cartridge. The memory stores hash values corresponding to the authentication values and by which the authentication values are verifiable by the printing device. The logic is to, in response to a request from the printing device for one of the authentication values and including an identifier, provide the authentication value associated with the identifier to the printing device. The logic is to, in response to a request from the printing device for one or more hash values of the hash values, provide the requested one or more hash values.

23 Claims, 6 Drawing Sheets

Related U.S. Application Data

No. 15/842,121, filed on Dec. 14, 2017, now Pat. No. 10,277,399, which is a continuation of application No. 15/469,129, filed on Mar. 24, 2017, now Pat. No. 9,893,893, which is a continuation of application No. PCT/US2016/038211, filed on Jun. 16, 2016.

(51) Int. Cl.
*B41J 2/175* (2006.01)
*G06F 12/14* (2006.01)

(52) U.S. Cl.
CPC ...... *G06F 12/1408* (2013.01); *G06F 12/1458* (2013.01); *H04L 9/3236* (2013.01); *G06F 2212/402* (2013.01); *H04L 9/3273* (2013.01)

(56) References Cited

U.S. PATENT DOCUMENTS

| | | | |
|---|---|---|---|
| 8,291,229 B2 | 10/2012 | Vuillaume et al. | |
| 9,141,816 B2 | 9/2015 | Refstrup | |
| 9,227,417 B2 | 1/2016 | Ignatchenko et al. | |
| 10,305,892 B2 * | 5/2019 | Shin | H04L 9/3271 |
| 10,386,746 B2 * | 8/2019 | Jeran | G03G 15/0863 |
| 2002/0033854 A1 | 3/2002 | Silverbrook | |
| 2002/0107806 A1 | 8/2002 | Higashi et al. | |
| 2005/0050326 A1 | 3/2005 | Mitchell | |
| 2006/0087678 A1 | 4/2006 | Simpson | |
| 2007/0077074 A1 | 4/2007 | Adkins et al. | |
| 2008/0077802 A1 | 3/2008 | Richardson et al. | |
| 2011/0078449 A1 | 3/2011 | Starr et al. | |
| 2011/0109938 A1 | 5/2011 | Refstrup | |

FOREIGN PATENT DOCUMENTS

| | | |
|---|---|---|
| TW | 200406674 | 5/2004 |
| WO | 2013062528 | 5/2013 |
| WO | 2015030818 | 3/2015 |

OTHER PUBLICATIONS

Xerox Authentication Label: Flow to Identify Genuine Xerox / Fuji Xerox Supplies, accessed online Sep. 2, 2016, < http://www.fujixerox.com/eng/support/auth_lable/ >.

Brother Genuine Supplies Authentication Center, accessed online Sep. 2, 2016, < http://www.brother-usa.com/supplies/security.aspx >.

* cited by examiner

REPLACEABLE ITEM AUTHENTICATION

BACKGROUND

Devices that use replaceable items include printing devices, including stand-alone printers, copy machines, and all-in-one (AIO) devices that can perform multiple functions, such as printing, copying, scanning, and/or faxing. Example replaceable items for such printing devices include ink, toner, and/or other types of colorant, including two-dimensional (2D) colorant. Other example replacement items, specifically for three-dimensional (3D) printing devices, include 3D printing agent and 3D printing build material.

DETAILED DESCRIPTION

Figure 1:
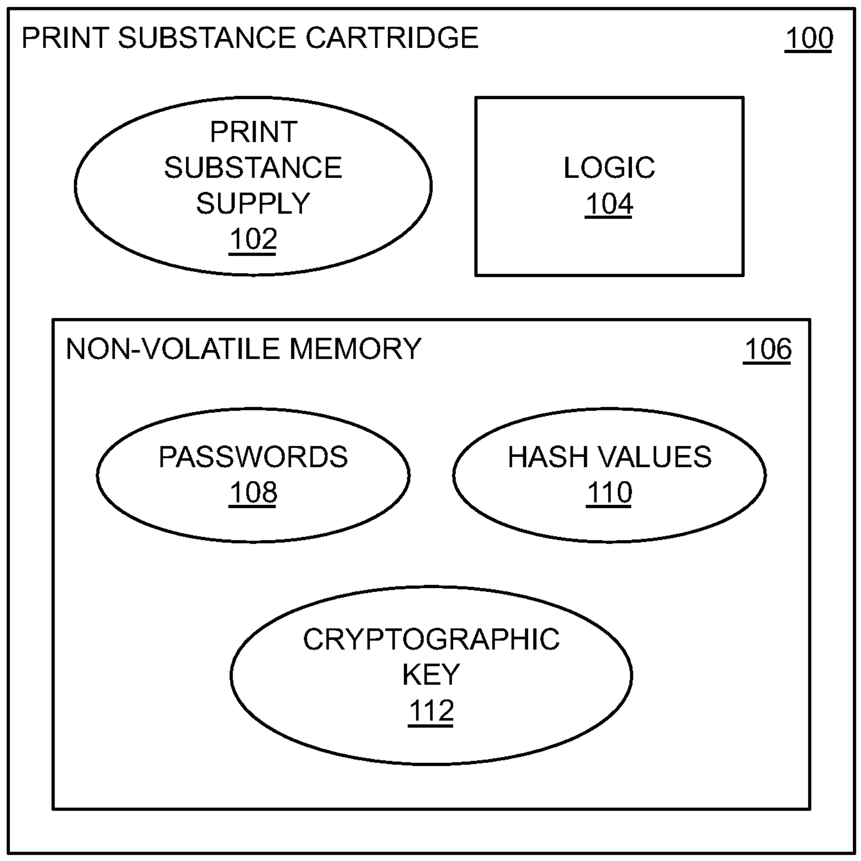
FIG. 1 is a diagram of an example print substance cartridge for a printing device.

As noted in the background, devices that use replaceable items include printing devices. A supply of print substance, such as colorant or another type of print substance, is stored in a cartridge that can be inserted into a printing device. When the supply becomes depleted, the cartridge can be replaced with a cartridge having a fresh supply of the print substance in question. Cartridges having different types of print substances can also be switched out as desired. As an example, a cartridge having general-purpose ink may be switched out for a cartridge having photo-quality ink within an inkjet-printing device as desired.

Manufacturers of printing devices also typically make or otherwise supply the print substance used in the printing devices. From the end user's perspective, using manufacturer-supplied or manufacturer-approved print substance cartridges can facilitate desired output by the printing devices and/or inhibit damage to the printing devices. For the original equipment manufacturer (OEM) it may be difficult to guarantee printing device output or printing device functioning if the printing device uses third party cartridges. A third party print substance is beyond the control of the OEM. For example, it could provide for different print output or entail a patenting risk of shortening the life of the print device. In some instances, such as 3D printers, there might even be a safety risk to a user when a print substance is a non-approved print substance. In certain instances, usage of non-approved print substance may affect a warranty associated with the printing device.

Manufacturers may therefore instill cartridges with authentication security. A printing device may interrogate the cartridge to determine if it is authentic. If the cartridge is not authentic (e.g., is not OEM approved), then the printing device may initiate a certain procedure, such as, for instance, informing the end user, such as immediately or soon after installation.

Techniques disclosed herein provide a novel, innovative authentication scheme for a print substance cartridge for a printing device, and more generally for a replaceable item for a (host) device in which the item can be installed (i.e., more generally, the device to which the item can be connected). The print substance cartridge stores a number of authentication values, or passwords. The cartridge includes logic (such as circuitry like a processor and memory storing code that the processor executes) to permit retrieval of just a subset of these authentication values. As different authentication values are requested from the cartridge, the cartridge can track the number of different values that have been returned. Once the cartridge has provided the maximum number of such unique authentication values, it will not provide any of the other authentication values that were originally stored in the cartridge. The cartridge continues to provide the previous authentication values that had been requested and returned, however.

As an example, a print substance cartridge may store sixty-four different passwords, or authentication values. Of these sixty-four, the cartridge may output no more than sixteen of the different passwords. Once the cartridge has provided sixteen different passwords, it will not provide any of the other forty-eight passwords that were stored in the cartridge. The cartridge can continue to respond to requests for the sixteen different passwords that it has already provided, however.

The print substance cartridge can also store hash values of the authentication values, or passwords. The hash values provide a way to determine whether a given authentication value that the cartridge has provided is correct. The cartridge may provide the hash values of the authentication values upon request, even for the values that the cartridge will not output. In the example of the previous paragraph, for instance, the cartridge can provide the hash values for all sixty-four passwords, even though the cartridge will provide no more than sixteen of the sixty-four passwords.

An authentication scheme using such a print substance cartridge may include a host printing device that might request four different passwords, or authentication values, stored in the cartridge. Different printing devices may and likely will request different passwords from a given cartridge. Similarly, a given printing device may and likely will request different passwords from different cartridges.

Having a print substance cartridge return a lesser number of authentication values than the total number of authentication values originally stored in the cartridge makes it much more difficult for a third party to frustrate such an authentication scheme. Even if a third party overcomes other security measures to obtain the sixteen authentication values that the cartridge will "give up," or output or provide, the likelihood that a third party cartridge storing just these sixteen values will be authenticated by a printing device is low. In the example authentication scheme that has been presented above, the printing device may and will likely request at least one authentication value that is not one of the sixteen values that the third party cartridge shares, rendering it unlikely that any given printing device will successfully authenticate such a cartridge.

FIG. 1 shows an example print substance cartridge 100 for a printing device. The cartridge 100 includes a print substance supply 102. The cartridge 100 may contain any volume of print substance, such as from several milliliters to tens of liters. Different examples of print substance include ink for an inkjet-printing device, and liquid or powder toner for a laser-printing device. Such ink and toner are themselves examples of two-dimensional (2D) colorant, which is colorant used by a suitable printing device to form images on media like paper that minimally if at all extend in a third dimension perpendicular to the two dimensions defining the plane of the surface of the media on which the images have been formed. Other examples of print substance include three-dimensional (3D) printing agent and 3D printing build material, which are used by a suitable 3D printing device to form a 3D object that is typically removable from any substrate on which the object is constructed. Certain print substances, such as ink, may be used for both 2D and 3D printing.

The print substance cartridge 100 includes logic 104. The logic 104 can be implemented as circuitry within the cartridge 100. For example, the logic 104 can include a processor, and a non-volatile computer-readable data storage medium storing computer-executable code that the processor executes. In this respect, then, in one implementation, the logic 104 may include a microprocessor and embedded software stored on the microprocessor itself, where the non-volatile computer-readable data storage medium is integrated within the microprocessor. In another implementation, the logic 104 may include a microprocessor and software embedded within a non-volatile medium separate from the microprocessor.

As another example, the logic 104 can be or include an application-specific integrated circuit (ASIC) or a field-programmable gate array (FPGA). More generally in this respect, the logic 104 can be implemented using logic gates. As a third example, the logic 104 may be implemented as any combination of a processor, software stored within the processor or on a medium separate to the processor, and logic gates.

The print substance cartridge 100 includes non-volatile memory 106. The memory 106 can be semiconductor memory, and is non-volatile in that when power is removed from the cartridge 100, the memory 106 still retains its contents. The memory 106 stores passwords 108, which are also referred to as authentication values herein. The memory 106 can store hash values 110 of, and which can individually correspond to, the passwords 108. The memory 106 can store a cryptographic key 112 from which the passwords 108 are able to be generated.

The memory 106 stores a number of the passwords 108, which is referred to as the total number of passwords 108. The passwords 108, or authentication values, are stored by the cartridge 100 so that the cartridge 100 can prove to a host printing device that it is authentic. Stated another way, the passwords 108 are used to authenticate the cartridge 100 within the printing device. The passwords 108 can be secured in an encrypted cryptographic manner, so that the passwords 108 are essentially irretrievable from the cartridge 100 outside of the approaches described herein. The passwords 108 can each be a series of bits, such as 256 bits.

The memory 106 can store one hash value 110 for each password 108. The hash values 110 are stored by the cartridge 100 so that the cartridge 100 can prove to a host printing device that the passwords 108 are correct. Stated another way, the hash values 110 are used to verify the passwords 108 provided by the cartridge 100 within the printing device. The hash values 110 may not be cryptographically secured in that they are freely retrievable from the cartridge 100, but may be cryptographically secured in that the hash values 110 cannot be modified. The hash values 110 may be one-way hash values 110 of the passwords 108, which means that a password 108 cannot be determined just by knowing its corresponding hash value 110, even if the one-way hash function used to generate the hash value 110 from the password 108 is known.

The hash values 110 can be provided by the cartridge 100 in one implementation in a way so that a host device is able to validate the hash values 110 as having been generated by an entity (i.e., the manufacturer or supplier of the cartridge 100) that the host device trusts. As one example, the hash values 110 may be cryptographically signed with a private cryptographic key prior to storage in the cartridge 100. The host device may use a corresponding public cryptographic key to validate the hash values 110. The private key may not be stored on the cartridge 100, and is unavailable publicly.

The logic 104 permits retrieval of a predetermined maximum number of the passwords 108, less than the total number of the passwords 108 stored in the non-volatile memory 106. The logic 104 can permit the retrieval of this smaller number of the passwords 108 (i.e., the predetermined maximum number of the passwords 108), however, an unlimited number of times from the memory 106. By comparison, the logic 104 prohibits retrieval of any password 108 other than the predetermined maximum number of passwords, even one time, from the memory 106.

Which of the passwords 108 are selected as the predetermined maximum number of the passwords 108 of which the logic 104 permits retrieval can be unspecified a priori. For example, as any host printing device in which the cartridge 100 is currently installed or otherwise to which the cartridge 100 is connected requests particular passwords 108, the logic 104 may return the requested passwords 108 until the predetermined maximum number has been reached. Thereafter, the logic 104 will just return passwords 108 that have already been requested, and not return any of the other passwords 108, once the predetermined number of the passwords 108 has been selected. Stated another way, the logic 104 can select the particular predetermined maximum number of the passwords 108 as any host printing device requests them, until the maximum number has been reached.

As an example, the non-volatile memory 106 may store sixteen passwords 108, numbered one through sixteen, and the logic 104 may return just four of these passwords 108. The cartridge 100 may be inserted into a first host printing device, which may request and receive passwords having numbers one and thirteen. Therefore, the logic 104 has effectively selected two of the four passwords 108 that the cartridge 100 will reveal, those numbered one and thirteen. The cartridge may then be removed from this host printing device, and inserted into another host printing device that requests and receives passwords having numbers six and thirteen. Therefore, the logic 104 has now effectively selected three of the four passwords 108 that the cartridge 100 will reveal, those numbered one, six, and thirteen.

The cartridge may be removed from the host printing device in which it is currently installed and inserted into a third host printing device, which may request and receive passwords having numbers seven and thirteen. Therefore, the logic 104 has now effectively selected all four of the four passwords 108 that the cartridge 100 will reveal, those numbered one, six, seven, and thirteen. The logic 104 may continue to return these four passwords 108, but will not return any other password 108. That is, the logic 104 will not return any password 108 unless it has a number of one, six, seven, or thirteen.

The non-volatile memory 106 used for the storage of the passwords 108 can be a write-once, read-limited memory. The passwords 108 are written to the memory 106 just once, such as during a secure manufacturing process. A predetermined maximum number of the total number of the passwords 108 can be read an unlimited number of times. The passwords 108 other than this predetermined maximum number become unreadable once the predetermined maximum number of the passwords 108 has been specifically selected. Each password 108 thus may be retrievable an unlimited number of times or may be irretrievable, but the logic 104 does not determine ahead of time which passwords 108 are which.

Therefore, the passwords 108 other than the predetermined maximum number of the passwords 108 are at least functionally erased once the predetermined maximum number of the passwords 108 have been specifically selected. They may be completely and indelibly erased from the memory 108 by the logic 104, for instance, in a manner so that "unerasing" or the recovery of the erased passwords 108 is considered impossible. The passwords 108 in question may be functionally erased in that these passwords 108 remain stored in the memory 108, but are irretrievable. For example, fuse links to the physical parts of the memory 108 where the passwords 108 in question are stored may be severed, rendering the passwords 108 irretrievable and thus functionally erased even though in actuality the passwords 108 remain in memory.

The memory 106 can store the cryptographic key 112 in lieu of the passwords 108 when the cartridge 100 is manufactured. In this implementation, prior to first usage of the cartridge 100, no passwords 108 may be stored in the cartridge 108. Rather, when a password 108 is requested, the cartridge 100 generates the password 108 "on the fly," if the predetermined maximum number of unique passwords 108 has not yet been generated and provided by the cartridge 100. Once the predetermined maximum number of unique passwords 108 has been generated, the cryptographic key 112 may be at least functionally erased, in the manner described in the previous paragraph.

Figure 2:
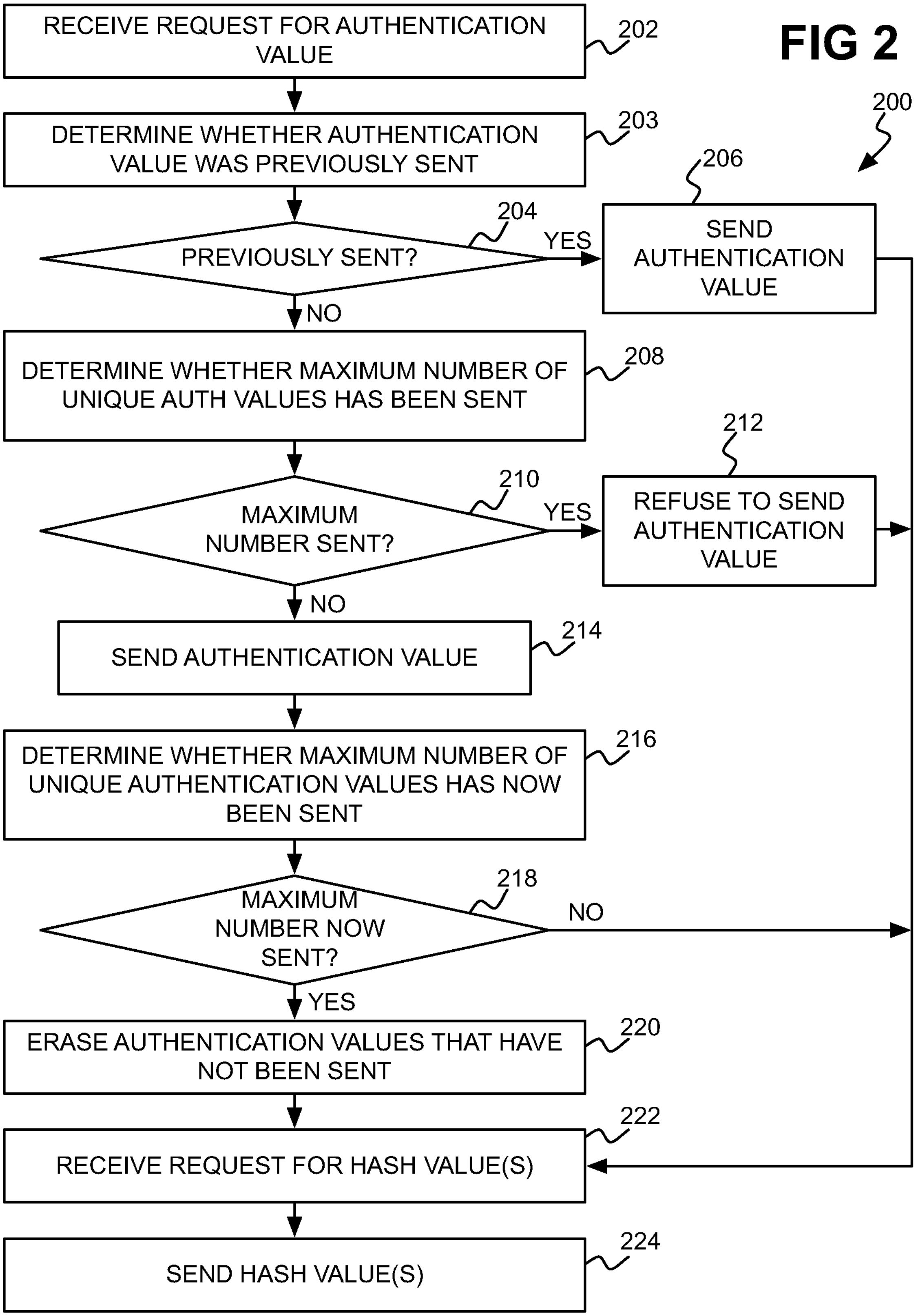
FIG. 2 is a flowchart of an example method that a print substance cartridge or other replaceable item for a device can perform.

FIG. 2 shows an example method 200 that a replaceable item for a device, such as the print substance cartridge 100 for a printing device, can perform. The method 200 can be implemented as computer-readable code stored on a non-transitory computer-readable data storage medium and that a processor executes. As such, the logic 104 of the cartridge 100 can perform the method 200, for example. The replaceable item performs the method 200 once it has been installed in a host device.

The replaceable item receives a request from the host device for a particular authentication value of a number of authentication values that the item may store (202). The request may be signed with a digital cryptographic key, or may be secured in another manner. The replaceable item determines whether it has previously sent the authentication value in question to any host device (203), including the host device in which the item is currently installed, as well as any other host device. If the replaceable item has previously sent the requested authentication value (204), the item returns the requested value to the host device (206).

However, if the replaceable item has not previously sent the requested authentication value (206), the item determines whether it has already sent the maximum number of unique authentication values (208). For example, of sixty-four authentication values that the replaceable item may store, the item may send no more than sixteen of these values. If the replacement item has already sent the maximum number of unique authentication values (210), the item does not send the authentication value that the host device in which the item is installed has requested (212).

However, if the replaceable item has not yet sent the maximum number of unique authentication values, then the item sends the requested authentication value to the host device (214). The replaceable item then can again determine whether the maximum number of authentication values has now been sent (216), including the authentication value that the item just sent in part 214. For example, if the item is permitted to send just sixteen of its sixty-four authentication values, if fifteen values were sent prior to performance of part 214, then a different, sixteenth authentication value is sent in part 214, such that the maximum number of sixteen different authentication values has now been sent.

If the maximum number of unique authentication values has now been sent (218), then the replaceable item can at least functionally erase the authentication values that it stores and that have not been sent (220). As such, in the ongoing example, once sixteen different authentication values have been sent, the other forty-eight authentication values are erased. Note that each time the method 200 of FIG. 2 is performed, then, the replaceable item can send any authentication value that it sent previously, and can send any authentication value that it has not sent previously so long as the maximum number of different authentication values that the item will send has not yet been reached.

From parts 206, 212, and 220, and from part 218 when the maximum number of unique sent authentication values has not yet been reached, or as an entry point to the method 200, the replaceable item can receive from the host device a request for one or more hash values corresponding to one or more authentication values (222). For example, the replaceable item may receive a request for all the hash values corresponding to all the authentication values, for just one of the hash values corresponding to just one of the authentication values, and so on. The replaceable item may receive a request for one or more hash values even after the authentication values that have never been sent are erased in part 220, after the maximum number of unique authentication values that the item will send has been reached in part 218. That is, the replaceable item may not erase the hash values for the authentication values that it erases, for instance. Part 222 can be considered as an entry point to the method 200 in that the request for the hash values can be received prior to receipt of a request for an authentication value.

Figure 3:
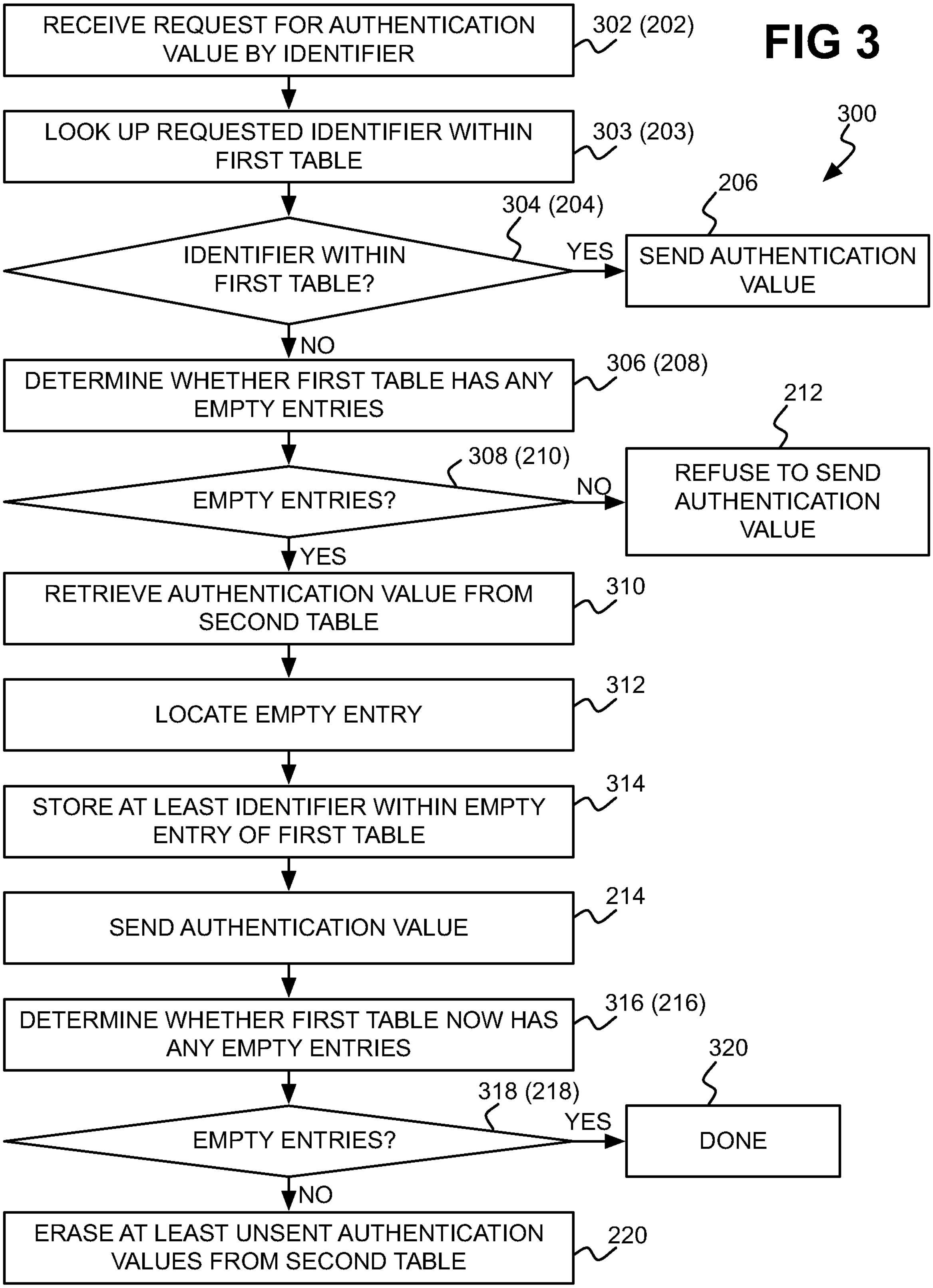
FIG. 3 is a flowchart of an example method that a print substance cartridge or other replaceable item for a device can perform to implement a portion of the method of FIG. 2.

FIG. 3 shows an example method 300 that is an example of a particular implementation of parts 202 through part 220 of the method 200. Identically numbered parts in FIGS. 2 and 3 are performed in the method 300 at least substantially as described above in relation to the method 200. Numbers in parentheses indicate that a given part of the method 300 is implementing a corresponding part of the method 200. That is, Y(X) in FIG. 3 means that part Y of the method 300 is implementing part X of the method 200.

In FIG. 3, the authentication values can have identifiers, such as corresponding unique identifiers, which may also be referred to as addresses. For example, if the replaceable item stores sixty-four authentication values, the identifiers may be one, two, three, and so on, through sixty-four. The replaceable item receives a request from the host device in which it is installed for an authentication value by identifier (302). For example, the host device may request the authentication value having the identifier ABCD, may request the sixth authentication value, such that the identifier of the requested authentication value is six, and so on.

In FIG. 3, the replaceable item can have two tables. The first table has a number of entries equal to the maximum number of different authentication values that the replaceable item will return to any host device. When the replaceable item has not yet been used in any host device, the entries may all be empty. That is, the entries of the first table are initially empty. The first table stores at least the identifiers of the authentication values that the replaceable item has sent to any host device. The first table may also store the authentication values themselves. The replaceable item can store the first table in a cryptographically secure manner.

The second table has a number of entries equal to the number of authentication values that the replaceable item stores, such as before the replaceable item has yet to be used in any host device. Each entry includes at least an authentication value. Each entry may further store the identifier of the authentication value. If the identifiers are not stored in the second table, then they may be determinable by reference. For example, if there are sixty-four entries, the first entry can store the authentication value with the lowest identifier, the second entry can store the authentication value with the identifier equal to the lowest identifier plus an increment value, and the third entry can store the authentication value with the identifier equal to the lowest identifier plus two times the increment value, and so on. The sixty-fourth entry thus can store the authentication value having the identifier equal to the lowest identifier plus sixty three times the increment value. If the lowest identifier is BASE, and the increment value is INC, the identifier of the n-th authentication value, where n is a value from one (the first authentication value) to N (the last authentication value) is $BASE+INC\times(n-1)$.

The replaceable item thus looks up the requested identifier within the first table (303). That is, if the replaceable item received a request from the host device in part 302 for the authentication value having a given identifier, the replaceable item looks up the given identifier within the first table. If the replaceable item received a request in part 302 for the fifth authentication value, the identifier of this authentication value may be five, or may be determined as described above, which the item then looks up within the first table. If the requested identifier is within the first table, then this means that replaceable item previously sent the authentication value having this identifier. If the requested identifier is not within the first table, then this means that the item has not previously sent the authentication value having this identifier.

If the identifier is within the first table, then the replaceable item sends the authentication value having this identifier (206). For instance, if the first table stores authentication values as well as their identifiers, then the replaceable item can retrieve the authentication value in question from the first table. If the first table just stores identifiers and not the authentication values themselves, then the replaceable item can retrieve the authentication value having the identifier in question from the second table to return to the host device.

If the identifier is not within the first table, then the replaceable item determines whether there are any empty entries within the first table (306). If there are empty entries within the first table, then this means that the replaceable item has not yet sent the maximum number of different authentication values. If there are no empty entries within the first table, then this means that the replaceable item has already sent the maximum number of different authentication values. Therefore, if there are no empty entries (308), the replaceable item refuses to send the requested authentication value (212).

However, if there are empty entries within the first table (308), then the replaceable item retrieves the authentication value having the requested identifier from the second table (310). The item locates an empty identifier within the first table (312), and stores at least the identifier of the retrieved authentication value within this empty entry (314). For instance, the item can store the authentication value within the entry as well as this value's identifier. The replaceable item then sends the authentication value back to the host device that requested the value (214).

The replaceable item next determines whether the first table now has any empty entries (316). If there are no more empty entries after the empty entry located in part 312 was filled in part 314, then this means that the maximum number of different authentication values that the replaceable item can provide has been reached. If there is still at least one empty entry in the first table after the empty entry located in part 312 was filled in part 314, then this means that the maximum number of different authentication values that the replaceable item can provide has not yet been reached. Therefore, if there are any empty entries left in the first table (318), the method 300 is finished (320).

If there are not any empty entries left in the first table (318), then the replaceable item erases authentication values from the second table (220). The replaceable item may erase from the second table just the authentication values that it has not provided, which are those authentication values having identifiers that are not stored in the first table. If the first table stores both identifiers and authentication values, as opposed to just identifiers, then the replaceable item may erase all the authentication values from the second table. For instance, the replaceable item may delete the second table entirely. The replaceable item can erase the second table because the item stores the authentication values that it will still return responsive to proper requests from host devices in the first table. In another implementation, the replaceable item responds to requests for authentication values from the first table, and if an authentication value requested is not stored in the first table, is able to retrieve the value from the second table for storage in the first table just if there is an available empty entry in the first table in which to store the requested value.

Figure 4:
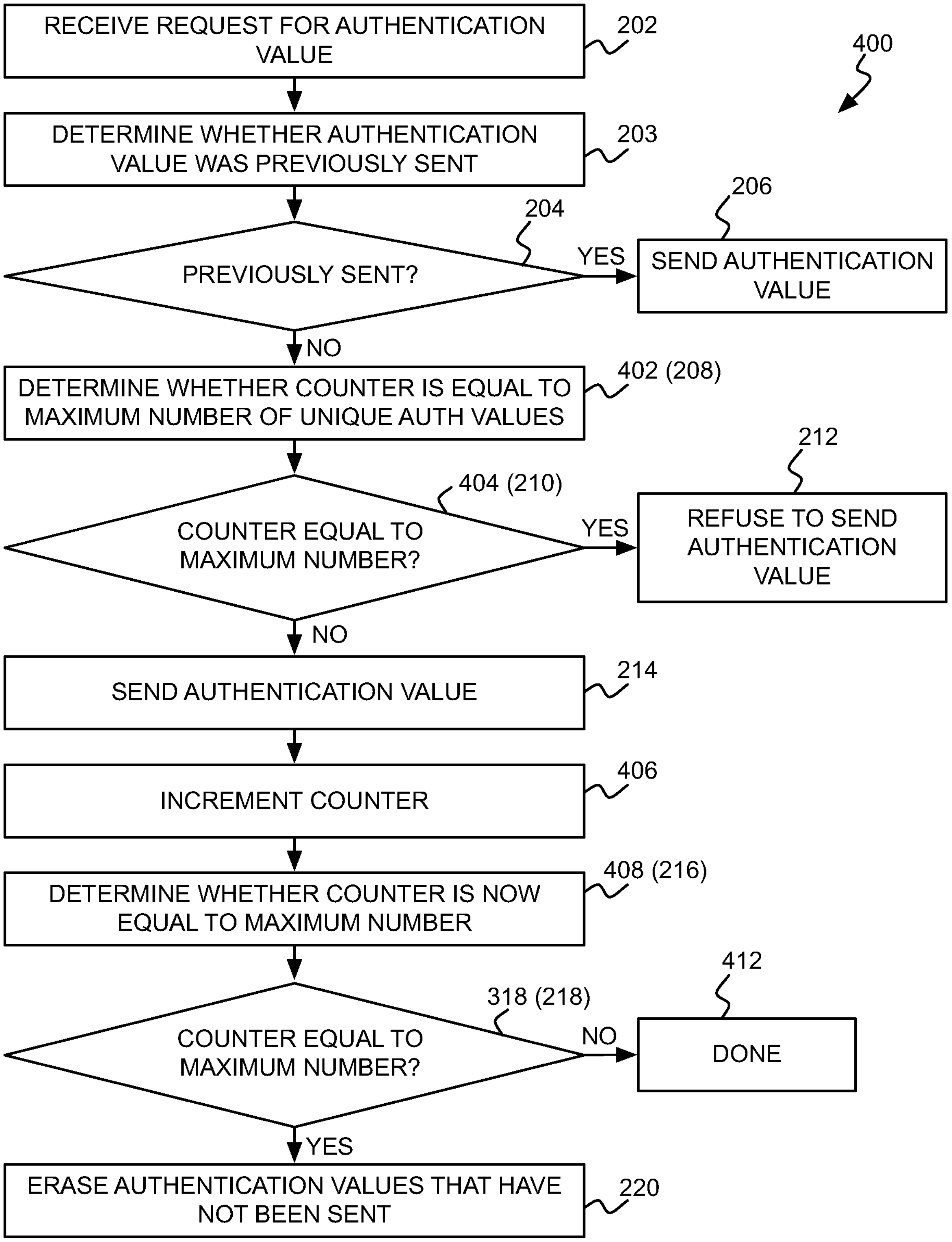
FIG. 4 is a flowchart of another example method that a print substance cartridge or other replaceable item for a device can perform to implement a portion of the method of FIG. 2.

FIG. 4 shows an example method 400 that is another example of a particular implementation of parts 202 through 220 of the method 200. Identically numbered parts in FIGS. 2 and 4 are performed in the method 400 at least as has been described in relation to the method 200. Numbers in parentheses indicate that a given part of the method 400 is implementing a corresponding part of the method 200. That is, Y(X) in FIG. 4 means that part Y of the method 400 is implementing part X of the method 200.

The replaceable item receives a request for an authentication value from the host device in which it is installed (202). The replaceable item determines whether the authentication value was previously sent (203). If the authentication value was previously sent (204), then the replaceable item sends the authentication value that has been requested back to the host device (206).

The replaceable item maintains a counter of the number of unique authentication values that the item has provided to any host device in the implementation of FIG. 4. The counter can be an increment-only counter, which can be increased and not decreased. The counter is stored in non-volatile memory, such as the non-volatile memory 106, and can be cryptographically secured.

The replaceable item determines whether the counter is equal to the maximum number of unique authentication values that the item will provide to any host device if properly requested (402). If the counter is equal to this maximum number of unique authentication values, then this means that the replaceable item has already provided the maximum number of different authentication values that it will provide to any host device. Therefore, if the counter is equal to the maximum number of unique authentication values (404), then the replaceable item does not send the requested authentication value to the host device (212).

If the counter is not equal to the maximum number of unique authentication values (i.e., the counter is less than this number), then this means that the replaceable item has not yet provided the maximum number of different authentication values that it will provide to any host device. Therefore, the replaceable item sends the requested authentication value back to the host device (214). The replaceable item also increments the counter (406).

The replaceable item determines whether the counter is now equal to the maximum number of unique authentication values that it will provide to any host device (408). If the counter is not yet equal to the maximum number of unique authentication values (410), then the method 400 is finished (412). However, if the counter is now equal to this number (410), then this means that the replaceable item has now sent the maximum number of different authentication values that it will provide, and as such, can erase the authentication values that have not been provided or sent to any host device (220).

Figure 5:
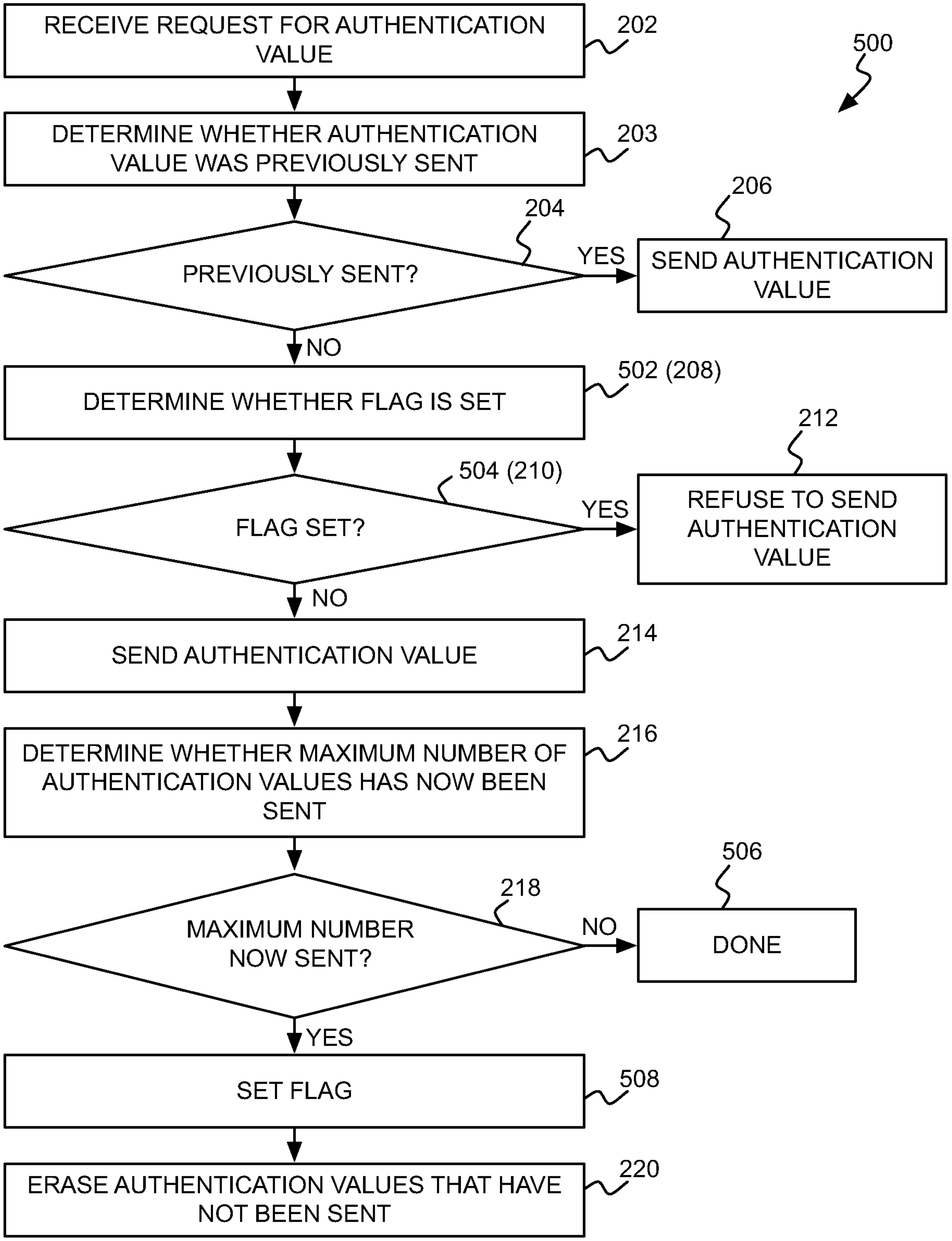
FIG. 5 is a flowchart of a third example method that a print substance cartridge or other replaceable item for a device can perform to implement a portion of the method of FIG. 2.

FIG. 5 shows an example method 500 that is a third example of a particular implementation of parts 202 through 220 of the method 200. Identically numbered parts in FIGS. 2 and 5 are performed in the method 500 at least as has been described in relation to the method 200. Numbers in parentheses indicate that a given part of the method 500 is implementing a corresponding part of the method 200. That is, Y(X) in FIG. 5 means that part Y of the method 500 is implementing part X of the method 200.

The replaceable item receives a request for an authentication value from the host device in which it is installed (202). The replaceable item determines whether the authentication value was previously sent (203). If the authentication value was previously sent to any host device (204), then the replaceable item sends the authentication value back to the host device in which it is installed (206).

The replaceable item maintains a flag corresponding to whether the item has provided the maximum number of unique authentication values to any host device in the implementation of FIG. 5. The flag can be a settable-only flag, which can be set but which cannot be cleared. The flag is stored in non-volatile memory, such as the non-volatile memory 106, and can be cryptographically secured.

The replaceable item determines whether the flag has been set (502). If the flag has been set, this means that the replaceable item has already provided the maximum number of different authentication values that it will provide to any host device. Therefore, if the flag is set (504), then the replaceable item does not send the requested authentication value to the host device (212). If the flag is not set, then this means that the replaceable item has not yet provided the maximum number of different authentication values that it will provide to any host. Therefore, the replaceable item sends the requested authentication value back to the host device (214).

The replaceable item determines whether the maximum number of unique authentication values has now been sent (216). If the maximum number of different authentication values has still not been sent (218), then the method 500 is finished. However, if the maximum number of different authentication values has now been sent (218), then the replaceable item sets the flag (508), and can erase the authentication values that have not yet been provided or sent to any host device (220).

In a different implementation, the flag is set prior to sending the authentication value. That is, in this implementation, it is determined whether the maximum number of authentications will have now been sent with the sending of an authentication value, and if so, then the flag is set, and after the flag has been set, the authentication value is sent. The authentication values that will not have been sent can also be erased in this implementation prior to sending the authentication value in question. More generally, any action that is performed due to the sending of the last unique authentication value that will be provided by the replaceable item, such as incrementing a counter, setting a flag, storing a value in a table, and so on, can be performed prior to sending this last unique authentication value. It is noted in this respect that, more generally still, any such action that is performed in conjunction with sending an authentication value (and not the last authentication value) can be performed prior to the authentication value actually being sent.

Figure 6:
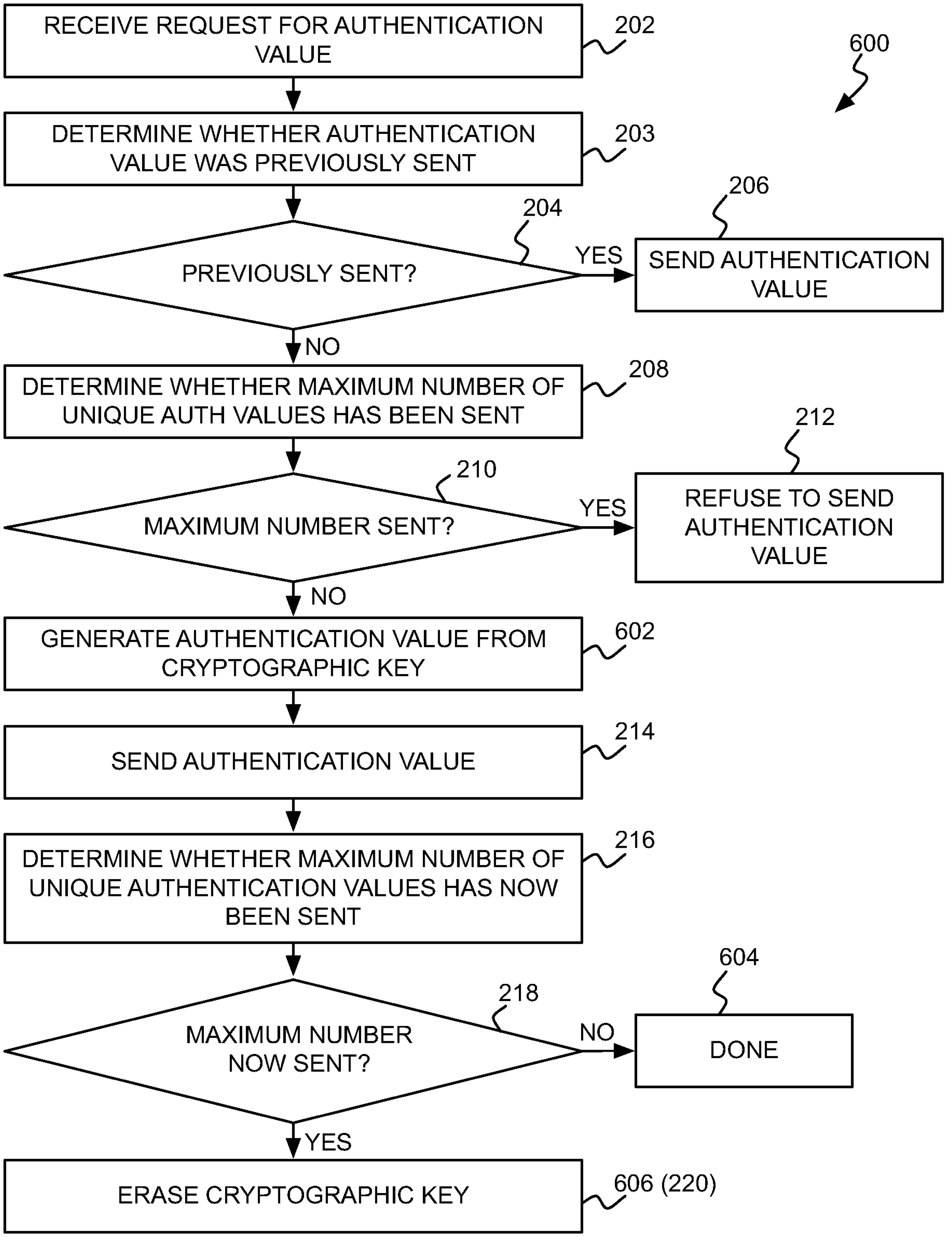
FIG. 6 is a flowchart of a fourth example method that a print substance cartridge or other replaceable item for a device can perform to implement a portion of the method of FIG. 2.

FIG. 6 shows an example method 600 that is a fourth example of a particular implementation of parts 202 through 220 of the method 200. Identically numbered parts in FIGS. 2 and 6 are performed in the method 600 at least as has been described in relation to the method 200. Numbers in parentheses indicate that a given part of the method 600 is implementing a corresponding part of the method 200. That is, Y(X) in FIG. 6 means that part Y of the method 600 is implementing part X of the method 200.

The replaceable item receives a request for an authentication value from a host device (202). The replaceable item determines whether the authentication value was previously sent (203). If the authentication value was previously sent to any host device (204), then the replaceable item sends the authentication value back to the requesting host device (206).

If the replaceable item has not previously sent the requested authentication value (206), then the item determines whether it has already sent the maximum number of unique authentication values (208). If the replacement item has already sent the maximum number of unique authentication values (210), then the item does not send the authentication value that the host device in question has requested (212). The method 600 is thus finished.

However, if the replaceable item has not yet sent the maximum number of unique authentication values (210), then the item generates the authentication value from a cryptographic key (602), such as the cryptographic key 112 of the print substance cartridge 100 of FIG. 1. In the implementation of FIG. 6, then, the passwords 108 may not be generated and a priori stored in the cartridge 100 at the time of manufacture of the cartridge 100. A never-used print cartridge 100 may not have any passwords 108 stored therein, but rather just stores the cryptographic key 112 from which the passwords 108 are able to be generated. The replaceable item thus sends the authentication value that has been requested and that the item has just generated to the host device (214). In this respect, it is noted that the implementation of FIG. 6 can be employed in conjunction with at least a portion of the implementation of FIG. 3, in which sent values are stored in a first table. As such, once the authentication value has been generated, it can be stored in the first table, so that the value does not have to be regenerated later, and if or when the cryptographic key is at least functionally erased, the authentication value can still be returned.

The replaceable item can again determine whether the maximum number of authentication values has now been sent (216), including the authentication value that the item just sent in part 214. If the maximum number of authentication values has not yet been sent (218), then the method 600 is finished. However, if the maximum number of authentication values has now been sent (218), then the replaceable item can at least functionally erase the cryptographic key (606), so that additional authentication values cannot be generated. The cryptographic key may be at least functionally erased once the authentication value has been generated in part 602, and prior to actually sending the authentication value in part 214 in one implementation.

The different implementations of parts of the method 200 that have been described in relation to the methods 300, 400, 500, and 600 can be combined or modified in different ways. For example, just the first table of the method 300 may be employed. One or more tables of the method 300 can be employed in conjunction with the counter of the method 400 and/or the flag of the method 500. The counter of the method 400 can be used in conjunction with the flag of the method 500 without either table of the method 300 as well. The first table of the method 300, the counter of the method 400, and/or the flag of the method 500 can be used in conjunction with the approach of the method 600.

The techniques disclosed herein may improve, or provide for another scheme for, cryptographic security of a replaceable item for a device, such as a print supply cartridge for a printing device. A replaceable item provides a limited number of the authorization values, or passwords, it stores. Once the maximum number of different authorization values has been provided, requests for the other authorization values will not be honored, even if they remain stored in the replaceable item. Such an approach may decrease the likelihood that a third party attempting to retrieve all the authorization values from the replaceable item will succeed. Furthermore, the likelihood that possession of just the maximum number of unique authorization values will result in successful authentication is very low.

We claim:

1. A print substance cartridge for a printing device, comprising:

- a supply of print substance for the printing device;
- a non-volatile memory storing:
  - a plurality of authentication values by which the print substance cartridge is authenticated by the printing device, and/or a cryptographic key from which a plurality of authentication values are able to be generated within the print substance cartridge;
  - a plurality of hash values corresponding to the plurality of authentication values and by which the authentication values are verifiable by the printing device; and
- logic to:
  - in response to a request from the printing device for one of the plurality of authentication values, the request including an identifier, provide the authentication value associated with the identifier to the printing device;
  - in response to a request from the printing device for one or more hash values of the plurality of hash values, provide the requested one or more hash values.

2. The print substance cartridge of claim 1, wherein the logic is further to, in response to receiving a request from the printing device for the hash values corresponding to all of the plurality of authentication values, provide the hash values corresponding to all of the plurality of authentication values.

3. The print substance cartridge of claim 1, wherein the authentication values comprise at least sixteen or at least sixty-four authentication values.

4. The print substance cartridge of claim 1, wherein the hash values are cryptographically signed with a private cryptographic key.

5. The print substance cartridge of claim 1, wherein the non-volatile memory stores the authentication values and the authentication values are cryptographically secured.

6. The print substance cartridge of claim 1, wherein the logic is further to, in response to request from the printing device for the hash value corresponding to the one of the plurality of authentication values, provide the requested hash value to the printing device, and wherein the request for the hash value corresponding to the one of the plurality of authentication values is received prior to or after the request for the one of the plurality of authentication values.

7. The print substance cartridge of claim 1, wherein the hash values are each a one-way hash value of a corresponding authentication value.

8. The print substance cartridge of claim 1, wherein the logic is to permit retrieval of all the hash values by the printing device an unlimited number of times.

9. The print substance cartridge of claim 8, wherein the logic is to permit retrieval of just a subset of the authentication values by the printing device.

10. The print substance cartridge of claim 9, wherein the logic is to permit retrieval of the subset of the authentication values by the printing device an unlimited number of times.

11. The print substance cartridge of claim 10, wherein the logic is to prohibit retrieval of any authentication value by the printing device other than the subset even one time.

12. The print substance cartridge of claim 11, wherein the logic is to select the subset of the authentication values as different authentication values of the authentication values are requested, until a predetermined maximum number of the subset of the authentication values has been reached.

13. The print substance cartridge of claim 1, wherein the non-volatile memory stores a plurality of identifiers with which the authentication values are associated.

14. The print substance cartridge of claim 1, wherein the non-volatile memory stores a table of the identifiers and the authentication values.

15. The print substance cartridge of claim 14, wherein the table is cryptographically secured.

16. The print substance cartridge of claim 1, wherein the non-volatile memory stores the cryptographic key from which the authentication values are able to be generated, and does not initially store the authentication values.

17. The print substance cartridge of claim 16, wherein in response to the request from the printing device for the authentication value associated with the requested identifier, the logic is to generate the authentication value associated with the requested identifier from the cryptographic key.

18. The print substance cartridge of claim 17, wherein after generating the requested authentication value, the logic is to store the authentication value associated with the requested identifier within the non-volatile memory.

19. The print substance cartridge of claim 18, wherein after storing the authentication value associated with the requested identifier within the non-volatile memory, the logic is to respond to subsequent requests for the authentication value associated with the requested identifier by retrieving the authentication value from the non-volatile memory and not by generating the authentication value from the cryptographic key.

20. The print substance cartridge of claim 17, wherein the non-volatile memory stores a table that is initially at least partially empty, and in which the logic is to store the requested identifier and/or the authentication value associated with the requested identifier in response to receiving the request from the printing device for the authentication value associated with the requested identifier.

21. The print substance cartridge of claim 20, wherein the logic is to locate an empty entry within the table in which to store the requested identifier and/or the authentication value associated with the requested identifier.

22. The print substance cartridge of claim 20, wherein after storing the requested identifier and/or the authentication value associated with the requested identifier within the table, the logic is to respond to subsequent requests for the authentication value associated with the requested identifier by retrieving the requested identifier and/or the authentication value associated with the requested identifier from the table.

23. The print substance cartridge of claim 1, wherein the authentication values are passwords.

* * * * *